July 25, 1944.  L. M. BENKERT  2,354,190
WELDING APPARATUS
Filed March 21, 1942  2 Sheets-Sheet 1
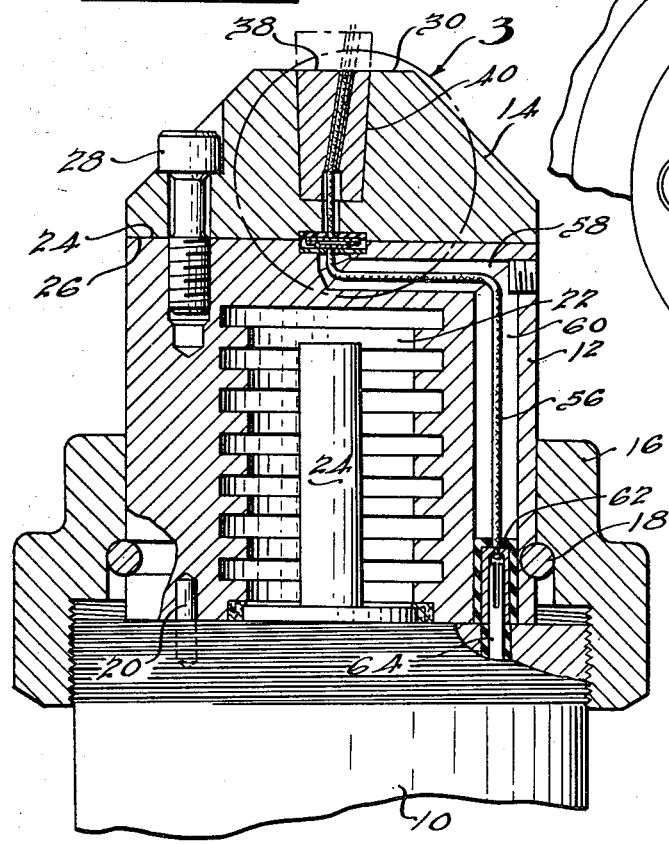
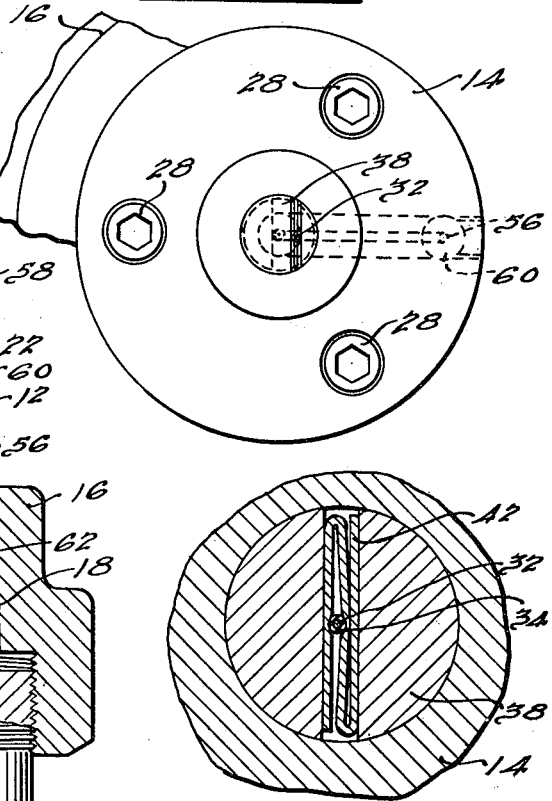
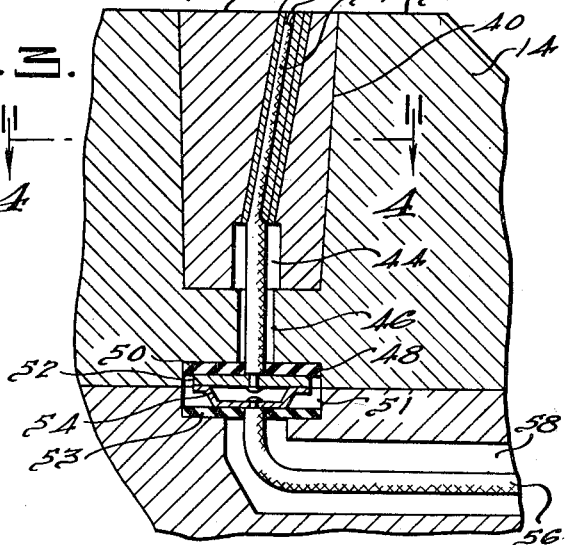
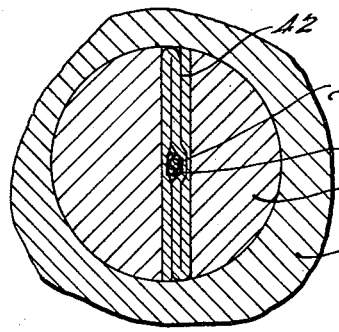
INVENTOR
Louis M. Benkert.
BY
Harness, Dickey & Pierce
ATTORNEYS.

July 25, 1944.    L. M. BENKERT    2,354,190
WELDING APPARATUS
Filed March 21, 1942    2 Sheets-Sheet 2
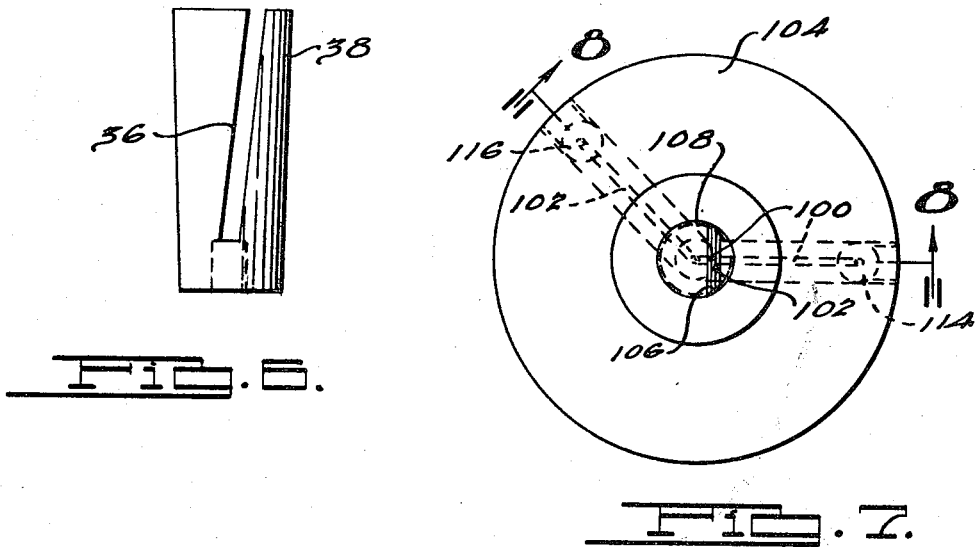
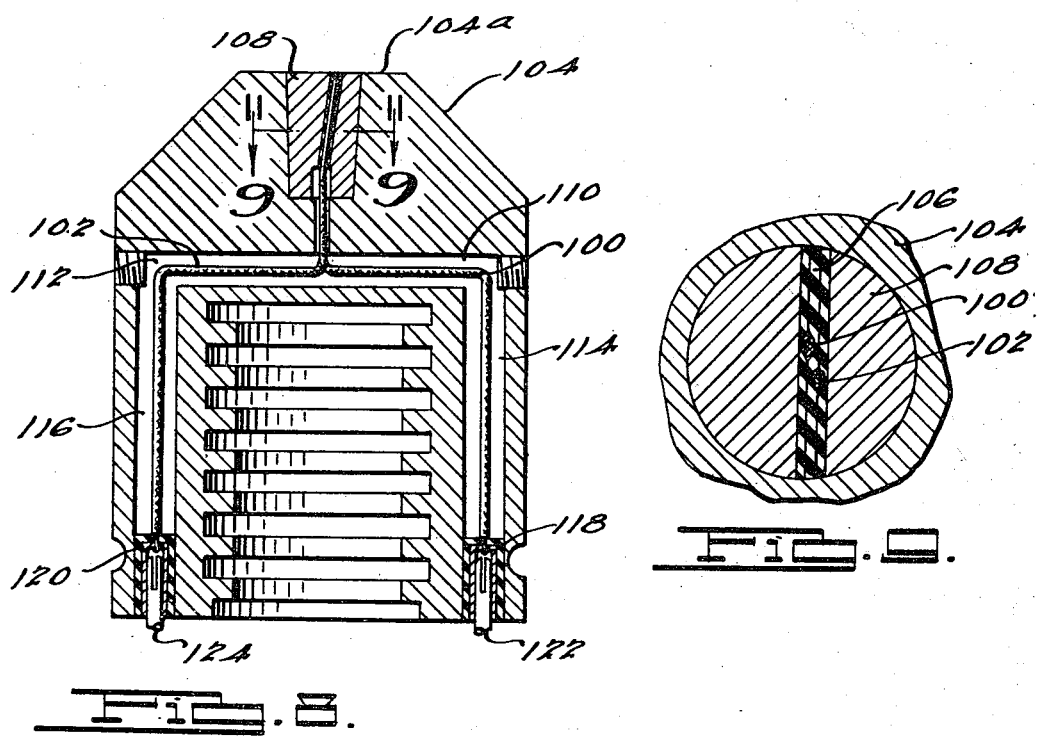
INVENTOR
Louis M. Benkert.
BY
Harness, Dickey & Pierce
ATTORNEYS.

Patented July 25, 1944

2,354,190

UNITED STATES PATENT OFFICE 2,354,190

WELDING APPARATUS

Louis M. Benkert, Detroit, Mich., assignor to Progressive Welder Company, Detroit, Mich., a corporation of Michigan Application March 21, 1942, Serial No. 435,655

7 Claims. (Cl. 219—4)

The present invention relates to welding apparatus and in particular is directed to the provision of welding electrodes embodying thermoelectrically responsive elements. The present structures are improvements upon the structural arrangements disclosed and claimed in the copending application of Chester F. Leathers, Serial No. 415,015, filed October 15, 1941, and assigned to the Weltronic Corporation.

As is described in greater detail in the above copending application, the thermoelectric control of resistance welding operations is highly beneficial because it enables the duration of flow of welding current or the intensity of the welding current, or other characteristics of the welding cycle to be controlled in accordance with the temperature of the work within, or in the region of, the weld nugget. Thus, for example, in making successive welds, the period of current flow for successive welds may be automatically varied in such relation that in each instance the welding current is caused to flow long enough to enable the formation of a nugget of predetermined size, but is interrupted as soon as such size is attained. This automatic control eliminates a wide variety of variables which have heretofore been inherent in welding cycles and which are caused, for example, by the variation in area of the electrodes, which is caused by the mushrooming thereof, variations in the supply voltage, variation in the surface characteristics, thickness or number of pieces being welded, variations in inductance of the welding circuit, which are caused in making welds which are distributed over relatively wide surfaces, and variations due to the shunting away of current from the weld in progress through adjacent welds.

It will be understood that in resistance welding operations, such as spot and projection welding operations, the work is clamped between oppositely disposed electrodes. The welding current path extends from one electrode through the workpieces and thence through the other electrode. The high resistance points of this circuit are the two junctions between the respective electrodes and the work, and the junction or junctions between the engaging surfaces of the workpieces themselves. By virtue of the fact that the boundaries of the former two junctions are open to the air, and by virtue of the further fact that the electrodes are supplied with cooling means, the former two junctions are maintained at a considerably lower temperature than the workpiece junctions and are, consequently, of lower resistance. Consequently, the heat builds up most rapidly at the workpiece junctions, enabling the formation therebetween of the weld nugget. There is, however, a definite temperature gradient between the temperature in the body of the nugget and the temperature in the bodies of the electrodes and, neglecting shunting effects, a temperature measurement at any point along this gradient affords a measure of the temperature in the weld nugget. In accordance with the invention of the above copending application, the shunting effects may be eliminated by seeing to it that the point of temperature measurement is centrally located relative to the work engaging face of the electrode, and that the point of temperature measurement is not farther from the body of the nugget than a point a short distance inwardly of the electrode body from the work engaging face thereof. Within these limits it will be understood that a measurement of the temperature of the electrode engaging face of the work, or a measurement of the temperature of the work engaging face of the electrode is satisfactory.

With the foregoing general considerations in view, the principal objects of the present invention are to provide an electrode structure embodying thermoelectric means arranged to afford a temperature measurement which is proportional to the temperature within or in the region of the weld nugget; to provide such structures wherein, more particularly, the thermoelectric elements are so disposed as to provide a measurement which is not substantially affected by shunting effects; to provide, more particularly, an arrangement wherein the thermoelectric elements afford a direct measure, in one instance, of the temperature at the work engaging face of the electrode, and in another instance, at the electrode engaging face of the work; to provide such arrangements embodying an electrode tip formed to receive one or more thermocouple wires, which are disposed in certain instances to electrically engage the electrode tip at the work engaging face thereof, and in certain other cases, to electrically engage the work at the electrode engaging face thereof; to provide such arrangements wherein the wire or wires of the thermocouple are centrally located relative to the work engaging face of the electrode tip, so that the temperature measurements are not substantially affected by shunting effects; and to provide such arrangements which may readily and economically be manufactured and which are positive and reliable in operation.

With the above as well as other objects in view, which appear in the following description and in the appended claims, preferred but illustrative embodiments of the invention are shown in the accompanying drawings, through the several views of which corresponding reference characters are used to designate corresponding parts and in which:

Figure 1 is a view in central longitudinal section of an electrode structure embodying the invention;

Fig. 2 is an end view of the structure shown in Fig. 1;

Fig. 3 is a fragmentary enlarged view of that part of the structure shown in Fig. 1, which is encircled;

Fig. 4 is a view in horizontal section, taken along the line 4—4 of Fig. 3;

Fig. 5 is a view corresponding generally to Fig. 4, showing the relation of the elements at a predetermined stage of the assembly operation;

Fig. 6 is a view in elevation of the plug element employed in the construction of Figs. 1 through 5;

Fig. 7 is an end view of a modification of the invention;

Fig. 8 is a view in vertical section taken along the line 8—8 of Fig. 7; and

Fig. 9 is a view in horizontal section taken along the line 9—9 of Fig. 8.

It will be appreciated from a complete understanding of the present invention that the improvements thereof may be embodied in electrode constructions of widely differing types, intended for widely differing specific welding processes. The herein described embodiments of the invention are, therefore, to be regarded in an illustrative and not in a limiting sense.

Referring first to the embodiment of Figs. 1 through 6, the illustrative electrode comprises a usual holder 10, which carries a tip body 12 and a work engaging tip 14. The outer end of the holder 10 is planar and the inner end of the body 12 is complementary thereto. In the assembled positions of the parts, the flat faces of the members 10 and 12 directly abut each other and these members are held in assembled relation by means of a collar 16, which engages a shoulder, constituted by a link 18 on the body 12. The collar 16 is provided with threads which cooperate with corresponding threads on the holder 10, whereby the collar 16 may be tightened down so as to securely clamp the holder 10 and the body 12 together. The members 10 and 12 are held against relative rotation during this tightening operation by means of one or more dowel pins 20.

The body 12 and, if desired, the holder 10 are cored out, as indicated at 22 to afford a passage through which a cooling liquid may be circulated. The coolant is preferably introduced through a conduit 24, and the passage 22 may, as will be understood, communicate with a suitable exhaust conduit (not shown). Any suitable coolant may be utilized, although in accordance with the invention disclosed and claimed in the copending application of Leathers and Moehlenpah, Serial No. 415,184, filed October 16, 1941, it is preferred to use brine at a temperature well below the freezing point of water.

The replaceable tip 14 is provided with a flat inner face 26, which seats against the corresponding flat outer face of the body 12, and the members 14 and 12 are held in assembled relation to each other by a plurality of studs 28. As will be understood, the outer end surface 30 of the tip 14 is disposed to directly engage the work to be welded.

In accordance with the embodiment of the invention now being described, a thermoelectric potential is obtained, for measuring purposes, by utilizing the electrode as one element of a thermocouple and by embedding therein a conducting wire 32, which with the electrode forms a thermocouple. For example, assuming the electrode is formed of copper or one of the usual alloys thereof found suitable for electrode purposes, the wire 32 may be formed of any of the alloys known generally by the name "constantan."

The wire 32, which has an insulating sheath 34, is received in a slot 36 provided in a tapered plug 38. The plug 38 in turn has a drive fit within a tapered bore 40 formed in the tip 14.

In assembling the wire 32 with the plug 38, an insulated length of the wire may be relatively loosely wrapped in one or more folds of a strip 42 of conducting material, for example, copper strip, sufficient thicknesses of the strip 42 being used so that the assembly comprising the wire and the strip may be relatively readily inserted into the slot 36 in the plug 38. Thereafter, the plug 38 is driven into the bore 40, during which driving the plug 38 is constricted, thereby constricting the slot 36 and causing the strip 42 to very tightly wedge the wire 32. By properly proportioning the original taper of the plug 38 relative to the taper of the bore 40, it is possible to cause this tight wedging relation to extend substantially throughout the full depth of the slot 36. On the other hand, although an exceedingly tight wedging action is attained, the multiple plies of the strip 42 serve to protect the insulation 34 around the wire 32.

The plug 38 is preferably dimensioned so that when it is driven to the full depth of the bore 40, the larger end thereof projects outwardly from the face 30 to some extent, and at the conclusion of the driving operation, this excess metal is ground away or otherwise removed, thereby affording a flush relation between the surface 30 and the outer end of the plug 38.

In the initial completely assembled condition of the parts, it may be expected that the outer end of the plug 38, the outer end of the insulation 34, the outer end of the strip 42, and the outer end of the wire 32 will be flush with each other. The initial welding operations, however, develop sufficient heat at the work engaging face of the electrode to burn away the insulation 34 throughout a distance of a few thousandths of an inch from the end of the wire 32, leaving this extreme end portion of the wire 32 in a bare condition. The pressure of the work against the electrode face bends this exposed end of the wire over into solid engaging relation to the immediately adjacent strip 42, which strip 42 in turn is in solid engaging relation to the plug 38. The thermoelectric potential is thus developed at the junction between the wire 32 and the strip 42, which junction, as just mentioned, is at or immediately adjacent the work engaging face of the electrode.

The slot 36 in the plug 38 opens at its inner end into an enlarged bore 44, which in the assembled position of the parts registers with a bore 46 in the tip 14. The bore 46 in turn opens into a shallow counterbore 48, which receives an insulating disk 50 and a conducting contact member 52, to which the end of the wire 32 is soldered or otherwise electrically and mechanically connected.

The counterbore 48 registers with a corresponding counterbore 51 in the body 12, which receives an insulating disk 53 and a cooperating spring-like contact member 54. The spring-like contact member 54 is connected to a cooperating wire 56, which extends through connecting radial and longitudinal passages 58 and 60 to a jack 62. The external connection to the wire 56 is made through a plug 64, which is telescopingly received in the jack 62. The other external connection for the thermocouple may be applied directly to the electrode body, as will be understood.

When the tip 14 is seated upon the body 12, the contact member 52 engages and slightly depresses the spring-like contact member 54, thereby completing an efficient electrical connection between the wires 32 and 56, and a similar electrical connection between the wire 56 and the external circuit is made through the plug and jack assembly comprising the members 62 and 64.

It will be understood that as the face of the electrode wears away, or is ground away in dressing operations, the end of the plug 38 is correspondingly ground away. Similarly, the strip 42 and the end of the wire 32 are ground away. After each dressing, the initial welding operations burn away an additional short length of the insulation 34 and again cause the bared end of the wire 32 to solidly engage the strip 42, thereby again completing the thermocouple at a point immediately adjacent the new face of the electrode. Following each dressing operation, accordingly, the thermocouple is automatically renewed.

In the modified embodiment of the invention shown in Figs. 7, 8 and 9, two thermocouple wires 100 and 102 are embedded in the electrode tip 104, and the laminated or folded material 106 is formed of insulating material such as mica. With this construction, accordingly, the exposed ends of the wires 100 and 102, which in the original manufacture and in subsequent dressing operations are continuously ground flush with the work engaging face 104a of the electrode, directly engage the surface of the work and two thermal E. M. F.'s are produced, each of which is directly determined by the temperature of the surface of the work. One of these thermal E. M. F.'s is developed at the junction between the wire 100 and the work, and the other is developed at the junction between the wire 102 and the work. The thermal E. M. F. developed across the two wires 100 and 102 is consequently the algebraic sum of the just-mentioned two E. M. F.'s.

By proper selection of the material from which the wires 100 and 102 are formed, with reference to the work being welded, accordingly, it is possible to have the just mentioned two thermal E. M. F.'s act cumulatively. Thus, assuming the wire 100 is formed of copper and the work being welded is aluminum, the copper is thermally positive with respect to the aluminum. Assuming, further, that the wire 102 is formed of constantan, the aluminum work is thermally positive with respect to the constantan, and the E. M. F. between the wires 100 and 102 is thus the arithmetic sum of the copper to aluminum E. M. F. and the aluminum to constantan E. M. F.

As in the previous embodiment, the wires 100 and 102 are initially wrapped in the insulation 106, which is thereafter initially compressed and snugly introduced into the slot formed in the plug 108. Thereafter, the plug 108 is driven into the bore in the electrode tip 104, thereby restricting the slot and securely embedding the wires 100 and 102 in place, and in such relation that they are insulated from each other and from the electrode tip 104.

In the embodiment now being described, separate bores 110 and 112 are provided for the wires 100 and 102, respectively, which bores extend radially, as appears in Fig. 7, and communicate with longitudinal bores 114 and 116. As before, also, the ends of the wires 100 and 102 are connected to plug elements 118 and 120, which respectively receive jacks 122 and 124, to which the external connections may be made in any suitable manner.

As in the previous embodiment, it is preferred to position the wires 100 and 102 relatively near the center of the electrode face, so as to minimize or eliminate the previously described shunting effects.

By way of review, it will be appreciated from the foregoing that both of the herein described embodiments may generically be characterized as affording a temperature measurement which enables control of the welding operation in accordance with the temperature in the region of the weld. In a more restricted sense, both embodiments afford a measurement which is substantially unaffected by shunting effects. Further, in the embodiment of Figs. 1 through 6, the actual temperature measured is the temperature at the work engaging face of the electrode, whereas in the embodiment of Figs. 7 through 9, the actual temperature which is measured is the temperature at the electrode engaging face of the work.

Although only two specific embodiments of the invention have been described in detail, it will be appreciated that further modifications in the form, number and arrangement of parts may be made without departing from the spirit and scope of the invention.

What is claimed is:

1. An electrode having a work engaging face provided with a bore which opens through said face, an insulated wire received in said bore, and a contractable holding member received in said bore, said member being so dimensioned relative to said bore that when it is introduced therein it is contracted by said bore, said contraction serving to enable said member to wedgingly hold said wire in said bore with an end of said wire exposed upon said face, pressure exerted between said face and the work serving to conductively couple the said end of the wire to associated means which, with said wire, forms a thermocouple.

2. The structure of claim 1, wherein said associated means comprises the said member.

3. The structure of claim 1, wherein said associated means comprises a second wire received in said member and wedgingly held in place therein by said contraction with an end of said wire exposed upon said face.

4. The structure of claim 1, wherein said associated means comprises the said member and the body of the electrode.

5. The structure of claim 1, wherein said associated means comprises a second wire received in said member and wedgingly held in place therein by said contraction with an end of said wire exposed upon said face, the exposed ends of said wires being electrically coupled together by said pressure.

6. The structure of claim 1, wherein said associated means comprises a second wire received in said member and wedgingly held in place therein by said contraction with an end of said wire exposed upon said face, the exposed ends of said wires being electrically coupled together through the work by said pressure.

7. The structure of claim 1 wherein said associated means comprises the body of the electrode.

LOUIS M. BENKERT.